Figure 3:
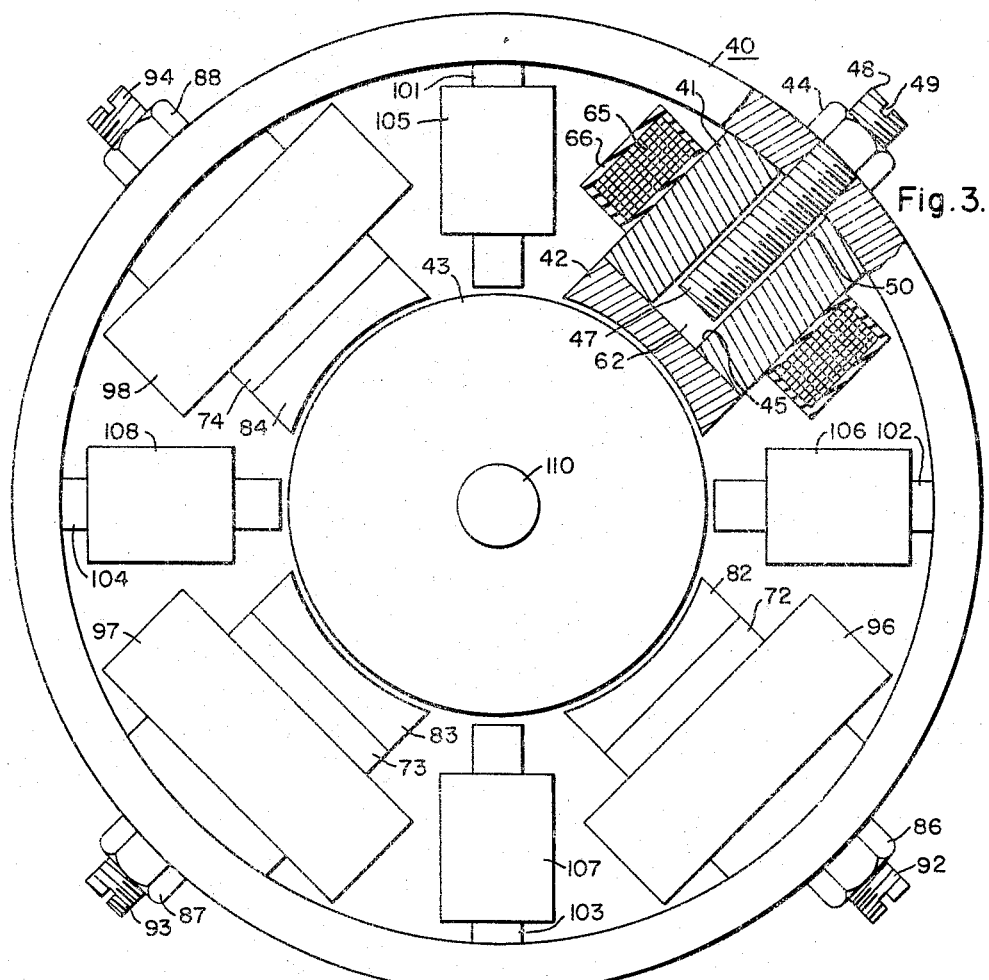

Oct. 26, 1965    J. E. SMITH ETAL    3,214,620
PERMANENT MAGNET MOTOR AND FLUX ADJUSTING
APPARATUS FOR USE THEREIN
Filed Dec. 28, 1962

INVENTORS
James E. Smith
Earl C. Watson.
BY *Maury I. Hull*
ATTORNEY

United States Patent Office 3,214,620
Patented Oct. 26, 1965

3,214,620
PERMANENT MAGNET MOTOR AND FLUX ADJUSTING APPARATUS FOR USE THEREIN
James E. Smith, Tonawanda, and Earl C. Watson, Williamsville, N.Y., assignors to Westinghouse Electric Corporation, Pittsburgh, Pa., a corporation of Pennsylvania
Filed Dec. 28, 1962, Ser. No. 247,897
3 Claims. (Cl. 310—181)

This invention relates to improvements in motors, and more particularly to an improved permanent magnet motor in which the speed may be precisely regulated by adjusting the strength of a magnetic field or fields.

The apparatus of the instant invention, in summary, includes but is not limited to a motor having salient poles which are composed of a material which can be permanently magnetized. Each of the poles has a coil disposed therearound, these coils being energized for a few seconds to set up a magnetic field and permanently magnetize the pole material, and thereafter being deenergized or disconnected, although they may be left on the poles. The pole members have bores or recesses extending along the longitudinal axes thereof, preferably substantially centrally therein. In the bore in each salient pole is a member of magnetic material which may be a bolt or slug, which can be moved axially, or have the position thereof adjusted, along the length of the pole to vary an air gap in a magnetic circuit.

In one embodiment, a threaded bolt of magnetic flux carrying material is disposed in a threaded bore in the yoke and extends into a bore in the pole member which is somewhat larger in diameter than the bolt, and the recession thus produced results in the formation of a shunt path for some of the magnetic flux produced by the permanent magnet, from the armature air gap, that is, a shunt path for some of the flux which would normally or otherwise pass through the armature air gap. As the bolt of this embodiment is screwed in toward the pole tip, the reluctance of the shunt path is decreased as the air gap is lessened, and accordingly the flux taking the shunt path increases, reducing the total flux and field strength at the armature, whereas, as the bolt is screwed outwardly, the amount of flux which follows the shunt path is reduced, and accordingly the amount of flux at the armature is increased.

Accordingly, a primary object of the invention is to provide a new and improved permanent magnet motor having means for adjusting the speed within a very fine tolerance.

A further object is to provide new and improved flux adjusting means for use in a permanent magnet motor, or generator.

Still a further object is to provide a salient pole for use in a motor having means for adjusting the magnetic flux caused at the armature by the salient pole.

Figure 2:
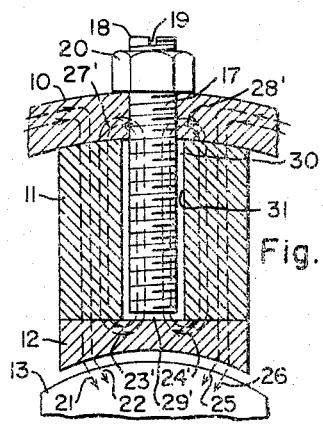
Figure 1:
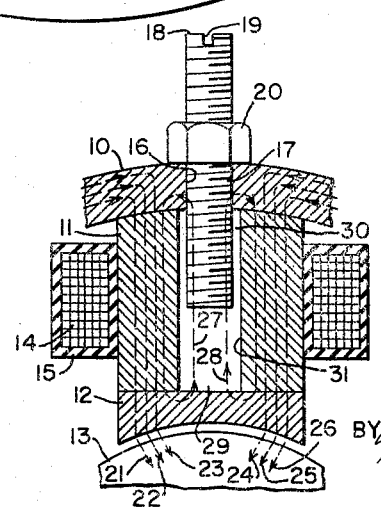

These and other objects will become more clearly apparent after a study of the following specification, when read in connection with the accompanying drawings, in which:

FIGS. 1 and 2 are cross-sectional views of a salient pole according to the invention, showing different adjustments of the axial position of the plug or other movable magnetic member; and FIG. 3 is an end elevational view of a motor according to the invention, one salient pole being shown in cross-section.

Referring now to the drawings, in which like reference numerals are used throughout to designate like parts, for a more detailed understanding of the invention, and in particular to FIG. 1 thereof, there is shown generally designated 10 the yoke of a motor having attached thereto a salient field pole generally designated 11, by bolts not shown for convenience of illustration. The field pole 11 has a pole tip 12 attached or secured thereto, in any convenient manner, the face of which is curved to correspond to the curvature of the armature generally designated 13. The field pole 11 is composed of magnetic material having a high retentivity, and the pole tip 12 is composed of magnetic flux carrying material. Disposed around the outside of the shank portion of the field pole is a coil generally designated 14 insulated from the field pole by the insulated housing or wrapping 15. As will be explained more fully hereinafter, the coil is energized by a direct current for a predetermined period of time after the motor is assembled to permanently magnetize the field pole 11, and thereafter the coil 14 may not be energized until excessive overloads weaken the magnetization of the field pole 11 and tip 12, or it is desired to demagnetize the field pole 11 in order to disassemble the machine for repair purposes, or for some other reason, in which case a current is made to flow through the coil in a reverse direction, demagnetizing the field pole 11.

The field pole 11 has therein a bore or aperture 31, illustrated as substantially centrally disposed therein, in alignment with a threaded bore 16 in the yoke member 10. Bore 31 is longer in diameter than bore 16. Disposed in the threaded bore 16 in the yoke 10 is a threaded bolt or plug 17 composed of a magnetic flux carrying material, the outer end 18 of the bolt 17 extending through the yoke and having a slot 19 therein for use of a tool in turning the bolt to adjust its position in the threaded bore, and having a lock nut 20 for securing the bolt in fixed position after the position has been adjusted satisfactorily. As previously stated, the bolt 17 is composed of magnetic flux carrying material, and may be composed of any material suitable for this purpose. The bolt 17 may extend into the bore 31 in pole member 11, a cylindrical space or recess 30 being formed between the outer wall of bolt 17 and the inner wall of bore 31. While the bolt 17 is adjusted to the position shown in FIG. 1 the magnetic flux through the yoke 10, the field pole 11 and the pole tip 12 into the armature 13 is illustrated by the six flux lines 21, 22, 23, 24, 25 and 26. It will be noted that other lines of flux 27 and 28 pass from the pole tip 12 through the air space 29 between the pole tip and the end of the bolt 17, through the bolt 17 to the yoke 10 and returns through the pole body 11 to the pole tip 12. These lines of flux 27 and 28 do not reach the armature, as shown. As will be readily understood by those skilled herein, the permeability of the air in the space 29 may have a value of 1, whereas the permeability of the magnetic material of which the bolt 17 is composed may have a value of several thousand or more. Accordingly, increasing the length of the space 29, that is screwing the bolt outwardly from the pole tip as shown in FIG. 1, increases the reluctance of that portion of the total magnetic circuit, so that as the bolt is screwed outwardly the total flux reaching the armature 13 is increased, and the amount of flux reaching the armature can be very finely adjusted by carefully positioning the bolt 17 in the threaded bore.

Particular reference is made now to FIG. 2 in which a salient pole according to the same embodiment as FIG. 1 of the invention is shown, but with the bolt 17 adjusted to a different position. Coil 14 is omitted in FIG. 2 for simplicity of illustration.

In the operation of the apparatus of FIG. 2, assuming that the bolt 17 is adjusted to the position shown, for a smaller air gap 29' between the pole tip 12 and the bolt 17, then the flux lines in the yoke, field pole, and pole tip which pass to the armature are illustrated by the lines 21, 22, 25 and 26. It will be noted that the flux lines reaching the armature while the bolt is in the position of FIG. 2 are less in number than those reaching the armature while the bolt is in the position of FIG. 1. It should be noted again that in the apparatus of FIGS. 1 and 2, because of the recess 30 between the bolt 17 and the adjacent wall of the bore 31 in the field pole, that a shunt path is provided for flux, in addition to the normal path through the yoke 10, field pole 11, pole tip 12 and armature 13. This shunt flux path includes portion of the yoke 10, a portion of the field pole 11, the pole tip 12, the air space 29 in the bore 31 between the lower end of the bolt 17 and the upper surface of the pole tip 12, and the bolt 17 itself which is composed of a magnetic flux carrying material. In FIG. 1, the shunt paths are indicated by the flux lines 27 and 28. It will be readily understood that since the permeability of the air in space 29 is much lower than the permeability of the magnetic flux carrying material in bolt 17, that screwing the bolt outwardly (FIG. 1) has the effect of increasing the reluctance of the shunt path and accordingly, as the bolt is moved outwardly the portion of the total flux which flows into the armature 13 is increased. On the other hand, as the bolt 17 is screwed into the field pole reducing the length of the air gap 29', the condition shown in FIG. 2, it will be seen that the reluctance of the shunt path through the bolt 17 and bore 31 is decreased, and accordingly, the portion of the total magnetic flux taking the shunt path is increased, and the portion of the flux reaching the armature 13 is decreased. This condition in which the bolt 17 has been screwed downwardly reducing the air gap is shown in FIG. 2, where the air gap has been reduced to a very small value 29', and flux taking the shunt path including the additional flux is indicated by the lines 23', 24', 27' and 28'.

Particular reference is made now to FIG. 3, in which the permanent magnet pole arrangement of FIGS. 1 and 2 is shown embodied in a four-pole direct current motor. In FIG. 3, the field pole 41 is seen to have an energizing coil 65 disposed therearound, the coil 65 being electrically insulated from the metal of the field pole by the insulating housing or wrapping 66. In the motor of FIG. 3, in addition to the field pole 41 having pole tip 42 and coil 65 with bolt 47, there are shown three other field poles disposed at spaced intervals around the yoke, these poles being designated 72, 73 and 74, having pole tips 82, 83 and 84, having coils 96, 97 and 98, and having adjustable bolts 92, 93 and 94 with lock nuts 86, 87 and 88, respectively. Disposed at spaced intervals between the field poles are four commutating poles or interpoles designated 101, 102, 103 and 104 having commutator windings 105, 106, 107, and 108, respectively. The armature 43 is seen to be mounted upon the rotatable shaft 110.

It has been found in practice that the speed of a permanent magnet motor, having the means of my invention for precisely adjusting the field strength within very small tolerances and by almost infinitesimal steps, may be regulated to within one revolution per minute of a desired speed. Such precise speed regulation has many applications; for example, in steel mills employing run out table motors, it is very desirable that the speed of the motors be matched closely to prevent buckling of the sheet of metal as it is rolled out over a plurality of rollers utilizing a plurality of motors to turn the same.

Whereas the invention has been described with respect to a motor, it should be understood that it is applicable to dynamoelectric machines in general employing permanent magnets, and may be used in generators.

Summarizing with respect to the apparatus of FIGS. 1, 2, and 3, when the magnetic shunt bolt is screwed out to increase the air gap between the bolt and the magnet pole tip, the number of magnetic lines of flux crossing the armature air gap will increase. This effect will decrease the speed of a direct current permanent magnet motor, or increase the terminal voltage of a direct current permanent magnet generator.

The number of magnetic lines of flux crossing the armature air gap will decrease when the bolt-pole tip air gap is decreased by turning the bolt in. The armature flux adjustment is caused by the variation of shunt bolt flux density as the bolt is moved in or out. With zero bolt-pole tip air gap, the bolt flux density will substantially equal the armature air gap density, and with the bolt removed completely, that is, maximum bolt air gap, all of the flux lines passing through the magnet (except for leakage) will cross the armature air gap.

The percentage of speed, or voltage variation, caused by full bolt movement, is dependent upon the area of the bolt-tip air gap.

Whereas the invention has been illustrated by a magnetic member movable in a bore inside the field pole, it should be understood that the movable magnetic member could be disposed in a groove or slot on the outside wall of the field pole, suitable retaining means being provided.

The invention includes the use of flux shields if desired to decrease the leakage.

The invention includes the use of shims of magnetic material, in accordance with known practice, for adjusting the spacing between the pole tip and the armature.

Whereas the invention has been shown and described with respect to a four-pole structure, it should be understood that it is not limited thereto.

Whereas the invention has been shown and described with respect to a magnetic pole composed of solid magnetizable material, it should be understood that the field pole and pole tip may have a laminated structure, if desired, suitable choice of materials being made.

Whereas a threaded bolt has been shown and described as a convenient means of providing a movable member which may be adjusted in position and secured in a desired position, it should be understood that the movable member could be smooth-surfaced and means, for example, a lock member or spring pressure means, could be used to maintain it in position. The term "bolt" as employed in the claims appended hereto includes such movable members.

Whereas the invention has been shown and described with respect to an exemplary embodiment thereof which gives satisfactory results, it should be understood that changes may be made and equivalents substituted without departing from the spirit and scope of the invention.

We claim as our invention:

1. In a dynamoelectric machine having a yoke member and a rotatable armature member, a permanent magnet salient pole member secured to the yoke member, said pole member having a central opening extending longitudinally thereof, and a magnetic shunt member of magnetic material disposed in said opening to shunt a portion of the magnetic flux of the pole member away from the magnetic path through the pole member and armature member, said shunt member being adjustable in position longitudinally of the pole member to control the amount of flux passing through said magnetic path.

2. A dynamoelectric machine having a yoke member, a rotatable armature, a plurality of permanent magnet salient pole members secured to the yoke member, each of said pole members having a central opening extending longitudinally thereof, and a magnetic shunt member of magnetic material disposed in the central opening of each of the pole members to shunt a portion of the magnetic flux of the pole member away from the magnetic path through the pole member and armature member, said shunt members being adjustable in position longitudinally of the pole members to control the amount of flux passing through said magnetic paths.

3. A dynamoelectric machine having a yoke member, a rotatable armature, a plurality of permanent magnet salient pole members secured to the yoke member, each of said pole members having a central bore extending longitudinally thereof, the yoke member having a plurality of threaded bores therethrough in alignment with the bores of the pole members, the bores of the yoke member being of smaller diameter than the bores of the pole members, a bolt member of magnetic material threaded in each of the bores of the yoke member, said bolt members extending into the bores of the pole members to shunt a portion of the magnetic flux of the pole members away from the magnetic paths through the pole members and armature member, the bolt members being adjustable in position relative to the pole members.

References Cited by the Examiner

UNITED STATES PATENTS

| | | | |
|---|---|---|---|
| 1,650,851 | 11/27 | Rosenberg | 310—191 |
| 1,895,049 | 1/33 | Rosenberg | 310—191 |
| 2,128,044 | 8/38 | Grabner | 171—227 |
| 2,610,993 | 9/52 | Stark | 310—190 |
| 2,625,674 | 1/53 | Petit | 322—25 |

ORIS L. RADER, *Primary Examiner.*

MILTON O. HIRSHFIELD, *Examiner.*